(12) United States Patent
Hugghins

(10) Patent No.: US 9,228,758 B2
(45) Date of Patent: Jan. 5, 2016

(54) MODULATING GAS FURNACE

(75) Inventor: Gordon Jeffrey Hugghins, Jacksonville, TX (US)

(73) Assignee: Trane International Inc., Piscataway, NJ (US)

( * ) Notice: Subject to any disclaimer, the term of this patent is extended or adjusted under 35 U.S.C. 154(b) by 251 days.

(21) Appl. No.: 13/572,252

(22) Filed: Aug. 10, 2012

(65) Prior Publication Data

US 2012/0310419 A1    Dec. 6, 2012

Related U.S. Application Data

(62) Division of application No. 12/611,616, filed on Nov. 3, 2009, now Pat. No. 8,261,733.

(51) Int. Cl.
| | |
|---|---|
| *F24H 9/20* | (2006.01) |
| *F24H 3/08* | (2006.01) |
| *F23N 1/02* | (2006.01) |
| *F23N 3/08* | (2006.01) |
| *F23N 5/18* | (2006.01) |
| *G05B 15/02* | (2006.01) |

(52) U.S. Cl.
CPC .............. *F24H 3/087* (2013.01); *F23N 1/022* (2013.01); *F23N 3/082* (2013.01); *F23N 5/184* (2013.01); *F24H 9/2085* (2013.01); *G05B 15/02* (2013.01); *F23N 2023/48* (2013.01); *F23N 2025/06* (2013.01); *F23N 2033/08* (2013.01); *F23N 2035/16* (2013.01); *F23N 2041/06* (2013.01)

(58) Field of Classification Search
CPC ......... F23N 1/022; F23N 3/082; F23N 5/184; F23N 2023/48; F23N 2025/06; F23N 2035/16; F23N 2041/06; F23N 2033/08; F24H 3/087; F24H 9/2085; G05B 15/02
USPC .......... 700/266, 271, 272, 274; 436/143, 159, 436/136, 160; 422/78, 177, 180, 182, 183, 422/204, 643, 223; 110/185, 186, 101 C, 110/101 CF
See application file for complete search history.

(56) References Cited

U.S. PATENT DOCUMENTS

| | | | | |
|---|---|---|---|---|
| 4,887,767 | A | * | 12/1989 | Thompson ............... F23N 1/002 126/116 A |
| 4,945,890 | A | * | 8/1990 | Ripka ................... F24H 9/1836 126/110 R |

(Continued)

OTHER PUBLICATIONS

Office Action dated Nov. 21, 2011, U.S. Appl. No. 12/611,616, filed Nov. 3, 2009; 5 pages.

(Continued)

*Primary Examiner* — Shogo Sasaki
(74) *Attorney, Agent, or Firm* — Conley Rose, P.C.; J. Robert Brown, Jr.; Michael J. Schofield

(57) ABSTRACT

A method controls a modulating gas furnace by monitoring a differential pressure associated with the modulating gas furnace, learning an intermediate value associated with an intermediate capacity between a minimum output capacity of the gas furnace and a maximum output capacity of the gas furnace, learning one of a high value associated with the maximum output capacity and a low value associated with a minimum output capacity, establishing an estimated operating curve using either the intermediate value and the low value or using the intermediate value and the high value, and operating the gas furnace in accordance with the estimated operating curve.

6 Claims, 5 Drawing Sheets

(56) References Cited

U.S. PATENT DOCUMENTS

| | | | |
|---|---|---|---|
| 5,060,722 A | 10/1991 | Zdenek et al. | |
| 5,271,556 A | 12/1993 | Helt et al. | |
| 5,331,944 A * | 7/1994 | Kujawa | F24H 9/2085 |
| | | | 126/110 R |
| 5,418,438 A * | 5/1995 | Hollenbeck | F23N 1/062 |
| | | | 165/246 |
| 5,524,556 A * | 6/1996 | Rowlette | F23N 1/06 |
| | | | 110/159 |
| 5,626,085 A * | 5/1997 | Donais | F23N 1/022 |
| | | | 110/101 C |
| 5,682,826 A * | 11/1997 | Hollenbeck | F23N 1/062 |
| | | | 110/147 |
| 5,791,332 A | 8/1998 | Thompson et al. | |
| 5,806,440 A * | 9/1998 | Rowlette | F23N 1/06 |
| | | | 110/162 |
| 6,257,870 B1 | 7/2001 | Hugghins et al. | |
| 6,377,426 B2 | 4/2002 | Hugghins et al. | |
| 2008/0014537 A1 * | 1/2008 | Atreya | F23G 7/065 |
| | | | 431/5 |

OTHER PUBLICATIONS

Office Action dated Jan. 5, 2012, U.S. Appl. No. 12/611,616, filed Nov. 3, 2009; 6 pages.

Notice of Allowance dated May 10, 2012, U.S. Appl. No. 12/611,616, filed Nov. 3, 2009; 8 pages.

* cited by examiner

MODULATING GAS FURNACE

CROSS-REFERENCE TO RELATED APPLICATIONS

This application is a divisional application of the prior filed and U.S. patent application Ser. No. 12/611,616 filed on Nov. 3, 2009, now U.S. Pat. No. 8,261,733, and entitled "Modulating Gas Furnace," which is hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and air conditioning systems (HVAC systems) sometimes incorporate gas furnaces for providing a heating effect to temperature controlled areas or comfort zones. Some gas furnaces comprise draft inducers that pull flue gases resulting from combustion through heat exchangers. It is known that draft inducers cannot dependably be factory set to a particular speed or flowrate in a manner that accommodates for the wide variation of installation furnace configurations and transient pressure fluctuations that may be present amongst different installation locations. For example, some gas furnaces may be installed with substantially different lengths of piping connected to an exhaust vent. Accordingly, it is known to provide a furnace with a variable speed draft inducer, the speed or flowrate of which may be adjusted once the gas furnace is installed and/or in operation. Some gas furnaces provide systems configured to learn operating speeds that are suitable for a particular installation of a gas furnace. For example, U.S. Pat. No. 6,257,870 (referred to hereinafter as the '870 patent) and U.S. Pat. No. 5,791,332 disclose systems and methods for operating a variable speed draft inducer of a gas furnace to account for static and dynamic variations in heat exchanger pressure differential, $H_X \Delta P$.

SUMMARY OF THE DISCLOSURE

In one embodiment, a method of controlling a modulating gas furnace is provided that comprises monitoring a differential pressure associated with the modulating gas furnace and learning an intermediate value associated with an intermediate capacity between a minimum output capacity of the gas furnace and a maximum output capacity of the gas furnace. The method further comprises learning one of a high value associated with the maximum output capacity and a low value associated with a minimum output capacity. The method further comprises establishing an estimated operating curve using either the intermediate value and the low value or using the intermediate value and the high value, and operating the gas furnace in accordance with the estimated operating curve.

In other embodiments, a gas furnace is provided that comprises a variable speed draft blower and a variable gas valve. The gas furnace further comprises a high pressure tap and a low pressure tap being configured to monitor a pressure differential associated with the gas furnace. The variable speed draft blower and the variable gas valve are configured for variations in operation in response to variations in the differential pressure. The variable speed draft blower speed is configured for variation in accordance with an estimated operating curve, the estimated operating curve being based on one of a maximum learned value associated with a maximum output capacity of the gas furnace and a minimum learned value associated with a minimum output capacity of the gas furnace. The estimated operating curve is also based on an intermediate learned value associated with an intermediate capacity between the minimum output capacity and the maximum output capacity.

In yet other embodiments, a modulating gas furnace is provided that comprises a variable speed draft blower, a modulating gas valve, a low pressure tap and a high pressure tap configured to monitor a pressure differential of the gas furnace, a low pressure limit switch configured to actuate in response to the pressure differential being substantially equal to a selected low pressure value, a high pressure limit switch configured to actuate in response to the pressure differential being substantially equal to a selected high pressure value, and an intermediate pressure limit switch configured to actuate in response to the pressure differential being substantially equal to a selected intermediate pressure value, the intermediate pressure value being between the low pressure value and the high pressure value. Variation in the operation of the variable speed draft blower results in variation of the pressure differential and variation of the pressure differential results in variation of the modulating gas valve. The modulating gas furnace is operated according to an estimated operating curve that is established either in response to the low pressure limit switch and the intermediate pressure limit switch being actuated or in response to the intermediate pressure limit switch and the high pressure limit switch being actuated.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Some gas furnaces are configured as variable output capacity devices (also referred to as "modulating furnaces"). In some modulating furnaces, variable speed draft inducers may be controlled to operate at speeds appropriate for various desired output capacities. However, during the process of determining the appropriate inducer speeds to be associated with particular desired output capacities, current systems may undesirably overheat or underheat a temperature controlled area, possibly resulting in creating and uncomfortable temperature controlled space. Accordingly, the present system provides, among other features, a modulating furnace that operates to determine the appropriate inducer speeds while minimizing undesirable overheating and/or underheating of a temperature controlled space.

Further, the present disclosure provides modulating gas furnaces and methods of operating modulating gas furnaces at desired output capacities in spite of the above-described static and dynamic factors affecting pressure differential. The present disclosure provides such operation without requiring operation of the furnace in a manner that may cause discomfort to persons in the space conditioned by the furnace. More specifically, the present disclosure provides systems and methods for operating a furnace in a manner that compensates for the above-described static and dynamic factors affecting pressure differential by, in some cases, estimating an appropriate operating curve for use in controlling the draft blower until an actual operating curve is established. In some embodiments of the present disclosure, the gas furnace may learn two values, estimate a substantially linear operating curve based on the two learned values, and operate the draft blower according to the estimated operating curve.

Figure 1:
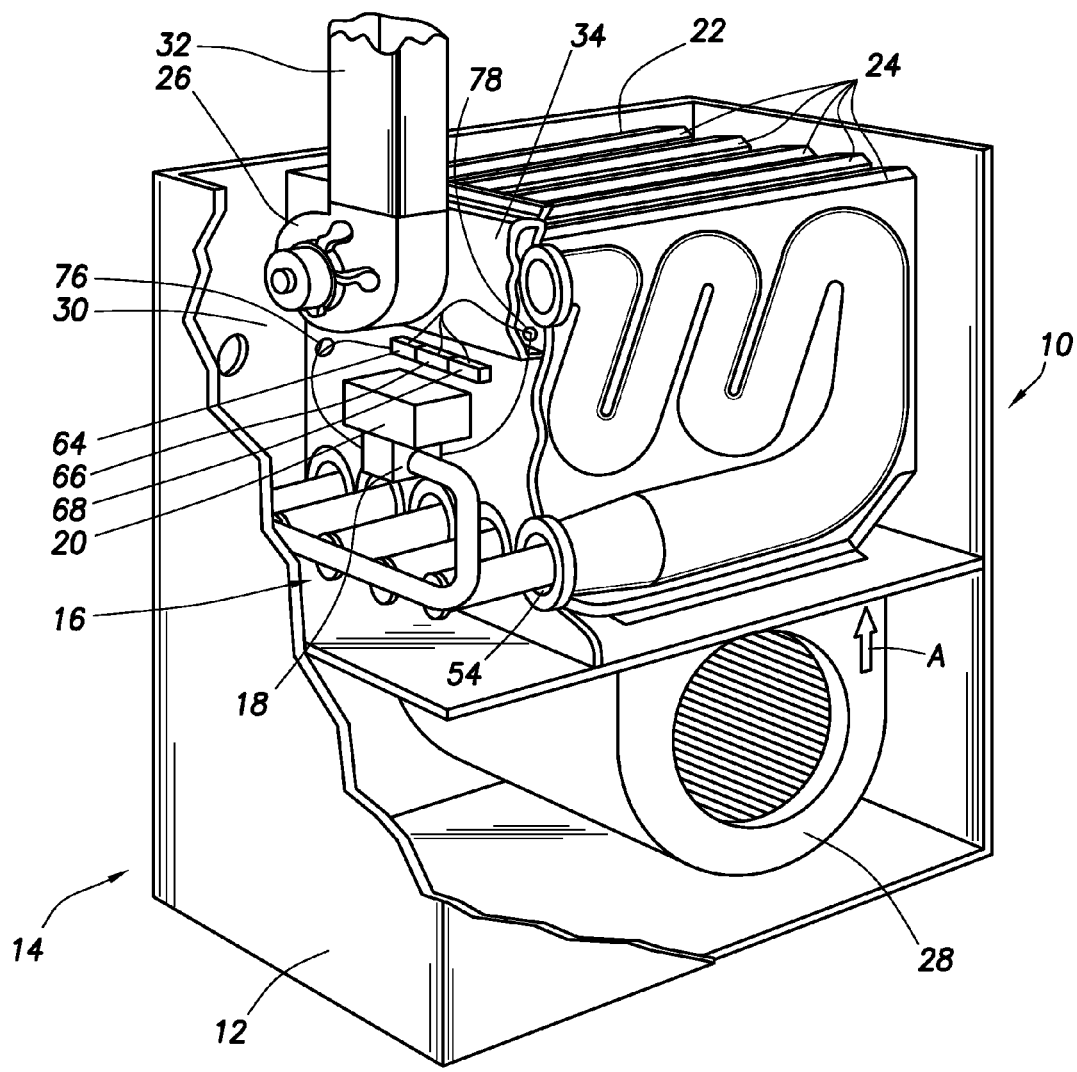
FIG. 1 is a cut-away view of a modulating gas furnace according to embodiments of the disclosure.

FIG. 1 shows a modulating gas furnace 10 that comprises substantial similarities to the gas furnace of U.S. Pat. No. 6,257,870 issued to Gordon Jeffrey Hugghins et al. and which is hereby incorporated by reference in its entirety. However, the modulating gas furnace 10 differs from the furnace of the '870 patent at least because the furnace 10 comprises a modulating combustion system 14. It will be appreciated that the term, "modulating," as used in this disclosure is meant to indicate that a system or device may be selectively operated at substantially any value over a range of performance values in a manner consistent with a control resolution of the system. Generally, the furnace 10 is operable so that the furnace 10 may selectively perform at substantially any selected output capacity value (kBtu/Hr) ranging from a maximum output capacity (100% output capacity) to a minimum output capacity (e.g., in some embodiments, about 40% of the maximum output capacity) with the modulating combustion system 14 capable of being constantly operated over a range of output capacities.

The modulating combustion system 14 is housed within the cabinet 12 and comprises a burner assembly 16, a modulating gas valve assembly 18, and a control assembly 20. The furnace 10 further comprises a heat exchanger assembly 22 which comprises a plurality of heat exchangers 24, a variable speed induced draft blower 26, and a variable speed circulating air blower 28. It will be appreciated that the furnace 10 further comprises a combustion intake space 30 that surrounds the exterior of the draft blower 26 and the exterior of the heat exchangers 24. When the draft blower 26 draft is operated, air is drawn from the intake space 30 and is passed through the heat exchangers 24 and into a header 34 that accepts exhaust from the heat exchangers 24 and provides a flow path for the exhaust to reach the draft blower 26. It will be appreciated that during operation of the furnace 10, the local pressure within the intake space 30 may be different from the local pressure within the header 34.

The pressure difference that exists between the intake space 30 and the header 34 is referred to as the combustion system pressure differential, or alternatively, may simply be referred to as the heat exchanger pressure differential ($H_x\Delta P$) or simply pressure differential. It is further understood by those of ordinary skill in the art of gas furnaces that the pressure differential may depend or vary in response to the physical nature of an exhaust vent 32 connected downstream of the draft blower 26, atmospheric conditions that affect the pressure within the intake space 30 and the header 34, and the speed of operation of the draft blower 26, among other factors. For example, the exhaust vent 32 and any other structure joined downstream of the exhaust vent 32 may experience a buildup of condensation within the interior of the exhaust vent 32 and attached devices. Such a buildup of condensation may increase resistance to fluid flow through the exhaust vent 32 which may increase the above-described pressure differential. Similarly, if the exhaust vent 32 is vented to an exterior of a building that is exposed to variations in wind speed or external barometric pressure, a change in wind speed or external barometric pressure may also cause variation in the pressure differential. Of course, changes in pressure local to the intake space 30 also may cause variation in the pressure differential.

Figure 2:
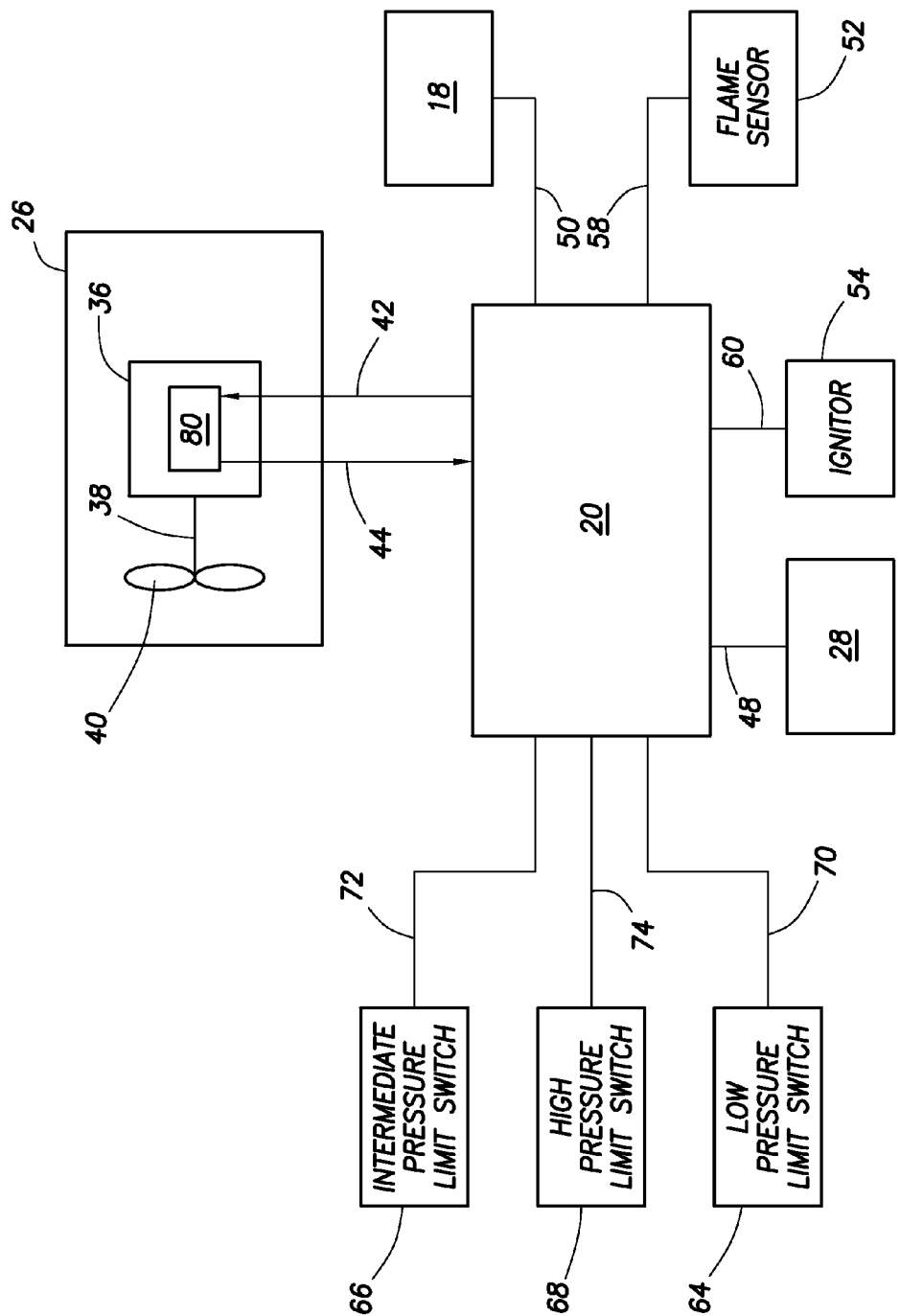
FIG. 2 is a simplified block diagram of some control components of the modulating gas furnace of FIG. 1 according to embodiments of the disclosure.

FIG. 2 shows an embodiment of the control assembly 20 as connected to various system components, including the draft blower 26. In the embodiment of FIG. 2, the draft blower 26 comprises a motor 36 for driving a shaft 38 which drives a blower wheel or fan 40. The motor 36 is a variable speed motor capable of sensing an operating speed and an operating torque of the motor 36 and communicating the operating speed and operating torque values to the control assembly 20. In this embodiment, the control assembly 20 is connected to the motor 36 by a communications transmit line 42 and a communications receive line 44. Of course, in other embodiments, the above-described bidirectional communication capability between the control assembly 20 and the motor 36 may be accomplished in any other suitable manner. Further, in some embodiments, communication between the control assembly 20 and the motor 36 may comprise use of digital serial communication methods. The control assembly 20 is connected to the modulating gas valve assembly 18 by control line 50. A flame sensor 52 and an igniter 54 are connected to the control assembly 20 by electrical lines 58 and 60, respectively.

Referring now to both FIGS. 1 and 2, the furnace 10 further comprises three pressure switches, a low pressure limit switch 64, an intermediate pressure limit switch 66, and a high pressure limit switch 68. Each of the pressure switches 64, 66, and 68 may be implemented as switches which open below desired pressure limits and close above the desired pressure limits. However, in alternative embodiments, the pressure switches 64, 66, and 68 may be replaced by pressure sensors suitable for sending analog or digital signals to control assembly 20. In this embodiment, the pressure switches 64, 66, and 68 are connected to the control assembly by pressure signal lines 70, 72, and 74, respectively. Each of the switches 64, 66, and 68 measure the pressure differential through the use of an upstream pressure tap 76 configured to monitor the pressure of the combustion intake space 30 and a downstream pressure tap 78 configured to monitor the pressure within the header 34. In alternative embodiments, the pressure taps 76 and 78 may be placed to monitor pressure of other locations that similarly provide pressure feedback necessary to operate switches 64, 66, and 68 in response to the pressure differential. It will further be appreciated that upstream pressure tap 76 and downstream pressure tap 78 are also pneumatically connected to modulating gas valve assembly 18 so that variations in the pressure differential result in substantially proportional variations in fuel gas provided to the burner assembly 16 by the modulating gas valve assembly 18.

Accordingly, the furnace 10 may be controlled to provide a desired output capacity by first controlling the speed of the induced draft blower 26, which affects the pressure differential and may cause the modulating gas valve assembly 18 to modulate to provide an appropriate gas fuel flow in response to the sensed pressure differential. Generally, this operation is possible due to the predicable and substantially proportional relationships between changes in draft blower 26 speed or RPM and the resultant changes in pressure differential and oxygen provided to the burner assembly 16 for combustion. In operation, changes in the induced draft blower 26 speed cause proportional and appropriate changes in the fuel gas provided by the modulating gas valve assembly 18.

The draft inducer motor 36 further comprises an integral controller 80 configured to communicate with the control assembly 20 regarding the status of the switches 64, 66, and 68. In alternative embodiments, the status of the switches 64, 66, and 68 may be input directly to the integral controller 80 via pressure signal lines 70, 72, and 74, respectively. In this disclosure, references to the draft blower motor 36 also refer to the component parts of the motor 36, including the integral controller 80. The motor 36 and/or the control assembly 20 may comprise control algorithms suitable for determining suitable operating speeds for the draft blower 26.

Figure 3:
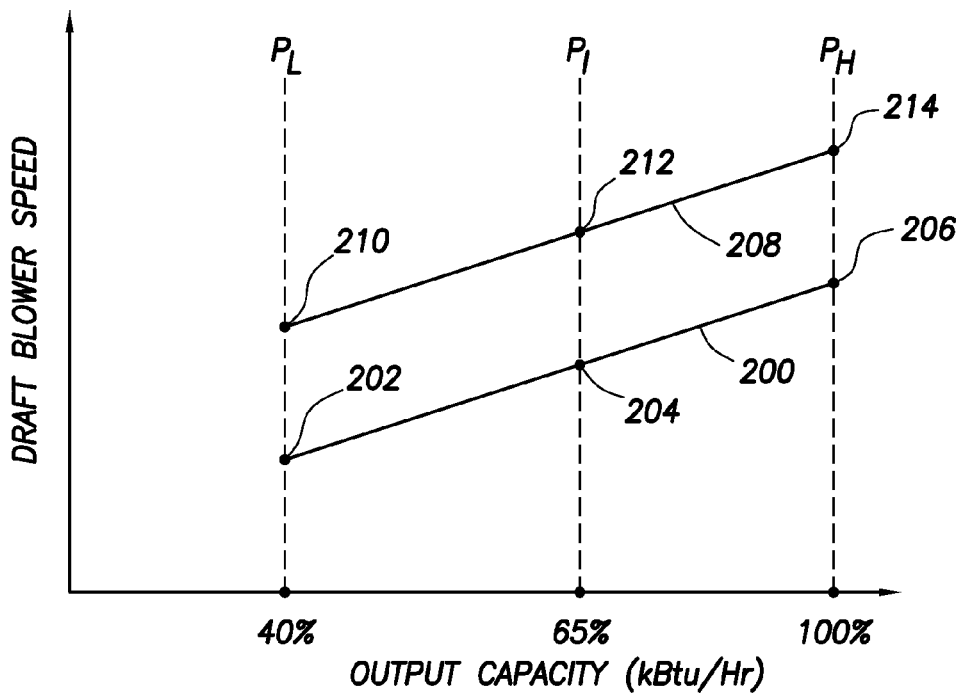
FIG. 3 is chart that illustrates two operating curves for the gas furnace of FIG. 1.

Referring now to FIG. 3, two actual operating curves of the modulating gas furnace 10 are shown. A lower actual operating curve 200 is shown as a substantially linear curve extending from about 40% output capacity to 100% output capacity. The lower actual operating curve 200 is representative of the draft blower 26 speed needed to cause the modulating gas valve assembly 18 and other components of the furnace 10 to operate at specified output capacities. In this embodiment, a low operating point 202 is associated with the draft blower 26 speed required to provide a low output capacity. In some embodiments, the low output capacity may have a value of 40% output capacity. Intermediate operating point 204 is associated with the draft blower 26 speed required to provide an intermediate output capacity. In some embodiments, the intermediate output capacity may have a value of 65% output capacity. High operating point 206 is associated with the draft blower 26 speed required to provide a high output capacity. In some embodiments, the high output capacity may have a value of 100% operating capacity.

The actual operating curve 200 is appropriate for use in controlling the furnace 10 under a first set of pressure conditions that yield a first pressure differential. However, if the pressure conditions change to a second set of pressure conditions yielding a pressure differential value higher than the first pressure differential, the actual operating curve 208 may become the appropriate curve to use in controlling the furnace 10. It will be appreciated that under the second set of pressure conditions, the draft blower 26 speed associated with low, intermediate, and high operating points 210, 212, 214, although higher in speed values than points 202, 204, 206, respectively, are required to provide the same low, intermediate, and high output capacities.

Further, it can be seen that while the differential pressures $P_L$, $P_I$, and $P_H$ required to operate the furnace 10 at low, intermediate, and high output capacities, respectively, remain constant regardless of changes in pressure conditions. Such constant relationships between differential pressure and output capacity allows low pressure limit switch 64 (when configured to actuate at $P_L$), intermediate pressure limit switch 66 (when configured to actuate at $P_I$), and high pressure limit switch 68 (when configured to actuate at $P_H$) to provide information to motor 36 and/or control assembly 20. Such information may be used by the draft blower 26 and/or control assembly 20 to capture and/or store appropriate draft blower 26 speed values at which the draft blower 26 must be operated to result in the furnace 10 operating at the respective output capacities. It will be appreciated that a furnace 10 may need to determine an appropriate operating curve in order for the furnace 10 to reliably be operated at a selected output capacity. In some embodiments, such determination may be accomplished by learning values for variables, LOW, INTERMEDIATE, and/or HIGH (each described in greater detail below).

Figure 4A:
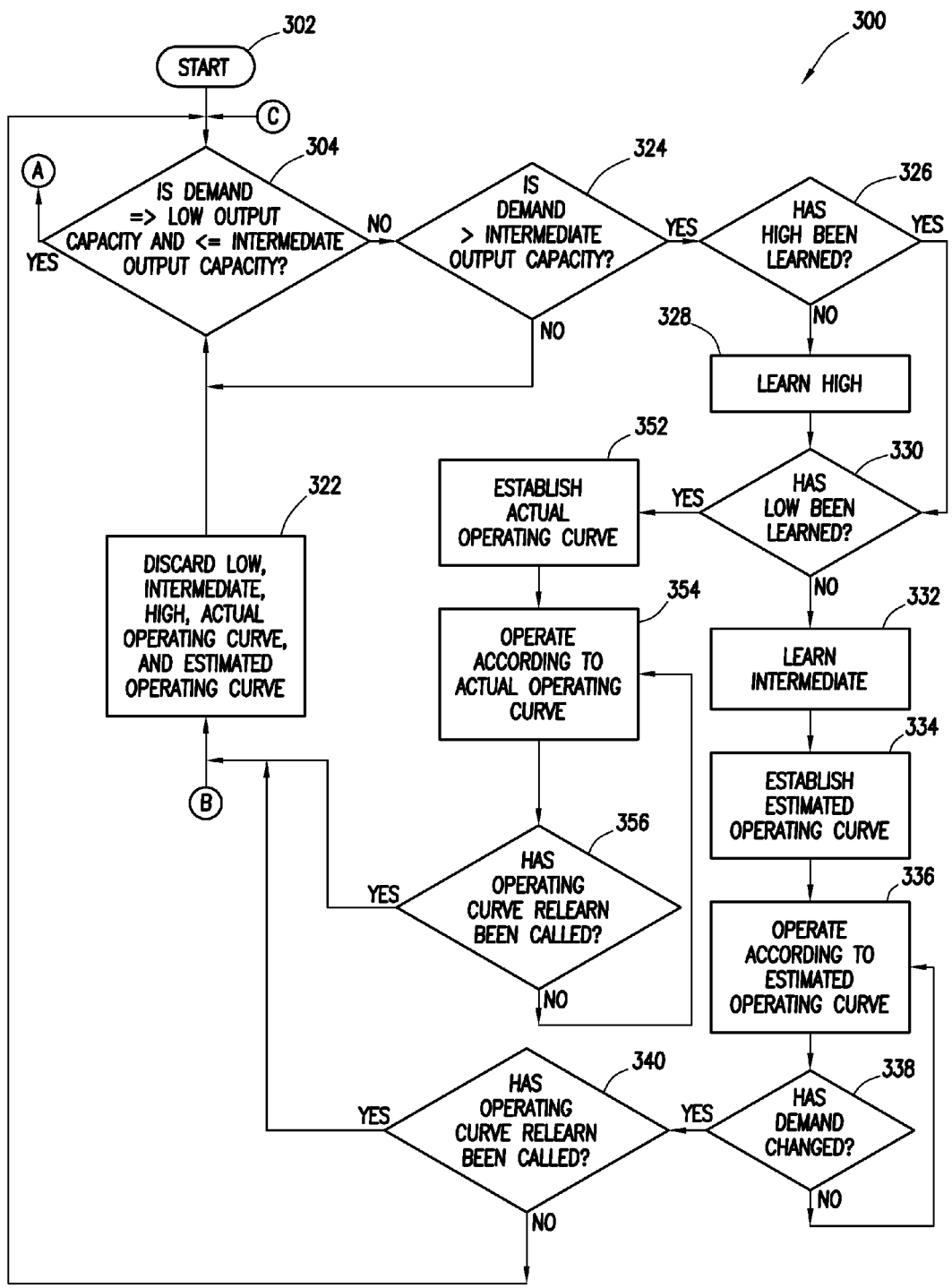
FIG. 4 comprises a flow chart that illustrates a method of operating the modulating gas furnace of FIG. 1.
Figure 4B:
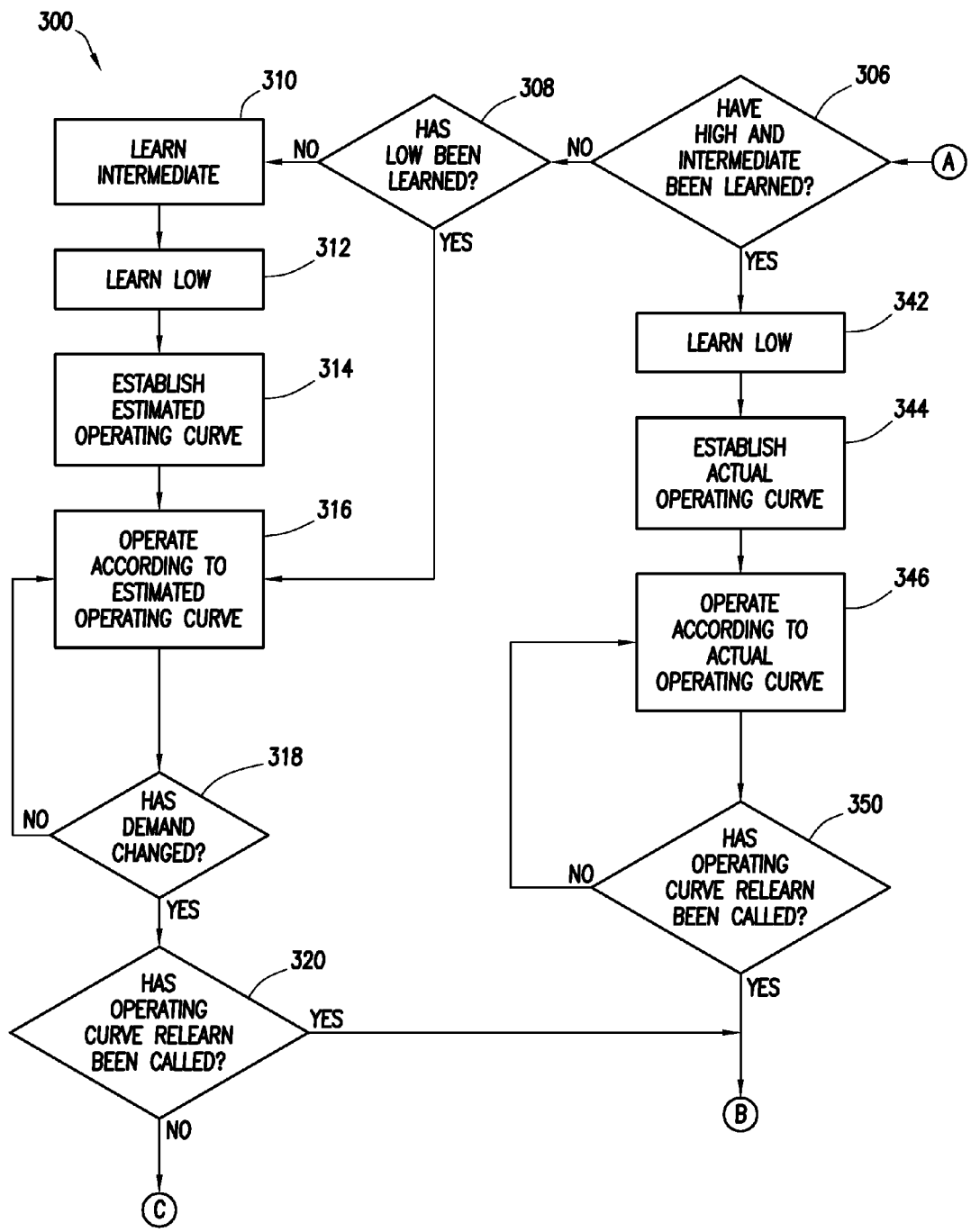

Referring now to FIG. 4, a method 300 of controlling the modulating gas furnace 10 is shown (FIG. 4). A furnace 10 may be operated according to the method so that undesirable overheating and/or underheating of a controlled space may be reduced by establishing an estimated operating curve based on only two operating points and thereafter varying the output capacity and associated draft blower 26 speed in accordance with the estimated operating curve. For purposes of this discussion, it will be understood that the furnace 10 may comprise a thermostat and/or other devices configured to determine and communicate to the control assembly 20 a DEMAND value (in some embodiments, expressed in terms of output capacity percentage) that represents the current system requirement and/or request for heat. Further, it will be appreciated that the variables, LOW, INTERMEDIATE, and HIGH, may be used to store various draft blower 26 speeds (RPM) that generate the differential pressures, $P_L$, $P_I$, and $P_H$, respectively. Still further, the variables, ESTIMATED OPERATING CURVE and ACTUAL OPERATING CURVE, may be conceptualized as simplified representations of the data sets of information required to calculate substantially linear estimated operating curves (based on either LOW and INTERMEDIATE values or based on INTERMEDIATE and HIGH values) and actual operating curves (based on LOW and HIGH values).

The method 300 may start at block 302, for example, in response to the furnace 10 first being run in a heating mode and before any of the above-described variables have been learned.

Proceeding to block 304, if the DEMAND value is equal to or greater than the low output capacity and the DEMAND value is less than or equal to the intermediate output capacity, the method proceeds to block 306. However, if the DEMAND value is not equal to or greater than the low output capacity and the DEMAND value is less than or equal to the intermediate output capacity, the method proceeds to block 324.

At block 306, the method determines whether HIGH and INTERMEDIATE have been learned. From block 306, the method proceeds to block 308 if HIGH and INTERMEDIATE have not been learned. However, from block 306, the method proceeds to block 342 if HIGH and INTERMEDIATE have been learned.

At block 308, the method determines whether LOW has been learned. From block 308, the method proceeds to block 310 if LOW has not been learned. However, from block 308, the method proceeds to block 316 if LOW has been learned.

At block 310, the method learns INTERMEDIATE. In some embodiments, the furnace 10 may be operated to incrementally approach the intermediate output capacity by incrementally changing the draft blower 26 speed. In some embodiments, the intermediate pressure limit switch 66 may be actuated from a closed circuit position to an open circuit position in response to the furnace 10 operating at the intermediate output capacity. Alternatively, in other embodiments, the intermediate pressure limit switch 66 may be actuated from an open circuit position to a closed circuit position in response to the furnace 10 operating at the intermediate output capacity. Still further, in other embodiments, a pressure sensor or other suitable device may detect and/or communicate a signal that indicates the furnace 10 is operating at the intermediate output capacity. Regardless of the manner in which the components of the furnace 10 accomplish such, at block 310, the value of INTERMEDIATE is set to the draft blower 26 speed at which the draft blower 26 was being operated when the furnace 10 achieved operation at the intermediate output capacity. Accordingly, it will be appreciated that operating the draft blower 26 at the INTERMEDIATE value will thereafter result in operation of the furnace 10 at the intermediate output capacity as long as static and dynamic variations in pressure differential are substantially the same as when the INTERMEDIATE value was stored. After learning the INTERMEDIATE value, the method proceeds to block 312.

At block 312, the method learns LOW. In some embodiments, the furnace 10 may be operated to incrementally approach the low output capacity by incrementally changing the draft blower 26 speed. In some embodiments, the low pressure limit switch 64 may be actuated from a closed circuit position to an open circuit position in response to the furnace 10 operating at the low output capacity. Alternatively, in other embodiments, the low pressure limit switch 64 may be actuated from an open circuit position to a closed circuit position in response to the furnace 10 operating at the low output capacity. Still further, in other embodiments, a pressure sensor or other suitable device may detect and/or communicate a signal that indicates the furnace 10 is operating at the low output capacity. Regardless of the manner in which the components of the furnace 10 accomplish such, at block 312, the value of LOW is set to the draft blower 26 speed at which the draft blower 26 was being operated when the furnace 10 achieved operation at the low output capacity. Accordingly, it will be appreciated that operating the draft blower 26 at the LOW value will thereafter result in operation of the furnace 10 at the low output capacity as long as static and dynamic variations in pressure differential are substantially the same as when the LOW value was stored. After learning the LOW value, the method proceeds to block 314.

At block 314, the method establishes and ESTIMATED OPERATING CURVE. In some embodiments, the ESTIMATED OPERATING CURVE comprises the necessary data and/or information to establish a substantially linear curve generally fit to the values of LOW and INTERMEDIATE. Further, establishing the ESTIMATED OPERATING CURVE may comprise establishing a table of draft blower 26 speed values at which the draft blower 26 must be operated to achieve selected output capacity values ranging from the low output capacity to the intermediate output capacity. It will be appreciated that any number of mathematical methods of establishing such a table may be implemented to result in a set of values that form a substantially linear curve. After the ESTIMATED OPERATING CURVE has been established, in some embodiments including writing and/or storing the set of values in a memory device in a retrievable manner, the method proceeds to block 316.

At block 316, the method operates the furnace 10 according to the ESTIMATED OPERATING CURVE. In some embodiments, the method may look up and/or retrieve from a table containing values of the ESTIMATED OPERATING CURVE a draft blower 26 speed required to operate the furnace 10 at the output capacity value of DEMAND. After retrieving an appropriate draft blower 26 speed value, the method may force operation of the draft blower 26 at the retrieved value. From block 316, the method proceeds to block 318.

At block 318, the method determines whether the DEMAND value has been changed. If the DEMAND value has not changed, the method proceeds back to block 316 and continues operation as described above. However, if the DEMAND value has changed, the method proceeds to block 320.

At block 320, the method determines whether the furnace 10 has requested a RELEARN. In this embodiment, a RELEARN may be a command generated by the furnace 10 that requires relearning of LOW, INTERMEDIATE, HIGH, ACTUAL OPERATING CURVE, and ESTIMATED OPERATING CURVE values. In this embodiment, the furnace 10 may be configured to issue a RELEARN command in response to substantial and/or sustained variation in the static and/or dynamic factors (other than the draft blower 26 operating speed) which contribute to the pressure differential. Relearning is appropriate in such cases because operating according to the already determined operating curves may no longer result in operating the furnace 10 at the output capacity requested by the DEMAND value. If the method determines that a RELEARN has not been requested, the method proceeds to block 304. However, if the method determines that a RELEARN has been requested, the method proceeds to block 322.

At block 322, the LOW, INTERMEDIATE, HIGH, ACTUAL OPERATING CURVE, and ESTIMATED OPERATING CURVE values are discarded and/or removed from memory. Next, the method proceeds to block 304.

Referring again to block 306, if at block 306 the method determines that HIGH and INTERMEDIATE have been learned (i.e., currently have values), the method proceeds to block 342.

At block 342, LOW is learned. The operation of block 342 is substantially the same as the operation of block 312. After LOW is learned, the method proceeds to block 344.

At block 344, the method establishes an ACTUAL OPERATING CURVE. In some embodiments, the ACTUAL OPERATING CURVE comprises the necessary data and/or information to establish a substantially linear curve generally fit to the values of LOW and HIGH. Further, establishing the ACTUAL OPERATING CURVE may comprise establishing a table of draft blower 26 speed values at which the draft blower 26 must be operated to achieve selected output capacity values ranging from the low output capacity to the high output capacity. It will be appreciated that any number of mathematical methods of establishing such a table may be implemented to result in a set of values that form a substantially linear curve. After the ACTUAL OPERATING CURVE has been established, in some embodiments including writing and/or storing the set of values in a memory device in a retrievable manner, the method proceeds to block 346.

At block 346, the method operates the furnace 10 according to the ACTUAL OPERATING CURVE. In some embodiments, the method may look up and/or retrieve from a table containing values of the ACTUAL OPERATING CURVE a draft blower 26 speed required to operate the furnace 10 at the output capacity value of DEMAND. After retrieving an appropriate draft blower 26 speed value, the method may force operation of the draft blower 26 at the retrieved value. From block 346, the method proceeds to block 350.

At block 350, the method determines whether the furnace 10 has requested a RELEARN. The operation of block 350 is substantially similar to the operation of block 320. If the method determines that a RELEARN has not been requested, the method proceeds back to block 346. However, if the method determines that a RELEARN has been requested, the method proceeds to block 322.

Referring again to block 304, if at block 304 the method determines that DEMAND is not greater than or equal to the low output capacity and less than or equal to the intermediate output capacity, the method proceeds to block 324.

At block 324, the method determines whether DEMAND is greater than the intermediate output capacity. If the value of DEMAND is not greater than the intermediate output capacity, the method proceeds back to block 304. However, if the method determines that DEMAND is greater than the intermediate output capacity, the method proceeds to block 326.

At block 326, the method determines whether HIGH has been learned. If the method determines that HIGH has not been learned the method proceeds to block 328. However, if the method determines that HIGH has been learned, the method proceeds to block 330.

At block 328, the method learns HIGH. In some embodiments, the furnace 10 may be operated to incrementally approach the high output capacity by incrementally changing the draft blower 26 speed. In some embodiments, the high pressure limit switch 68 may be actuated from a closed circuit position to an open circuit position in response to the furnace 10 operating at the high output capacity. Alternatively, in other embodiments, the high pressure limit switch 68 may be actuated from an open circuit position to a closed circuit position in response to the furnace 10 operating at the high output capacity. Still further, in other embodiments, a pressure sensor or other suitable device may detect and/or communicate a signal that indicates the furnace 10 is operating at the high output capacity. Regardless of the manner in which the components of the furnace 10 accomplish such, at block 328, the value of HIGH is set to the draft blower 26 speed at which the draft blower 26 was being operated when the furnace 10 achieved operation at the high output capacity. Accordingly, it will be appreciated that operating the draft blower 26 at the HIGH value will thereafter result in operation of the furnace 10 at the high output capacity as long as static and dynamic variations in pressure differential are substantially the same as when the HIGH value was stored. After learning the HIGH value, the method proceeds to block 330.

At block 330, the method determines whether LOW has been learned. If the method determines that LOW has not been learned, the method proceeds to block 332. However, if the method determines that LOW has been learned, the method proceeds to block 352.

At block 332, INTERMEDIATE is learned. Operation at block 332 is substantially similar to operation at block 310. After INTERMEDIATE is learned, the method proceeds to block 334.

At block 334, the method establishes an ESTIMATED OPERATING CURVE. Operation at block 334 is substantially similar to operation of block 314 except that the ESTIMATED OPERATING CURVE generated at block 334 is based on the values, INTERMEDIATE and HIGH, rather than LOW and INTERMEDIATE. Accordingly, the ESTIMATED OPERATING CURVE generated at block 334 may provide a table of values useful in operating the furnace 10 at output capacities ranging from about the intermediate capacity output to the high output capacity. After the ESTIMATED OPERATING CURVE has been established, in some embodiments including writing and/or storing the set of values in a memory device in a retrievable manner, the method proceeds to block 336.

At block 336, the method operates the furnace 10 according to the ESTIMATED OPERATING CURVE generated at block 334. In some embodiments, the method may look up and/or retrieve from a table containing values of the ESTIMATED OPERATING CURVE a draft blower 26 speed required to operate the furnace 10 at the output capacity value of DEMAND. After retrieving an appropriate draft blower 26 speed value, the method may force operation of the draft blower 26 at the retrieved value. From block 336, the method proceeds to block 338.

At block 338, the method determines whether the DEMAND value has been changed. If the DEMAND value has not changed, the method proceeds back to block 336 and continues operation as described above. However, if the DEMAND value has changed, the method proceeds to block 340.

At block 340, the method determines whether the furnace 10 has requested a RELEARN. The operation of block 340 is substantially similar to the operation of block 320. If the method determines that a RELEARN has not been requested, the method proceeds back to block 304. However, if the method determines that a RELEARN has been requested, the method proceeds to block 322.

Referring back to block 330, if the method determines that LOW has been learned, the method proceeds to block 352.

At block 352, the method establishes an ACTUAL OPERATING CURVE. Operation at block 352 is substantially similar to the operation of block 344. After the ACTUAL OPERATING CURVE has been established, in some embodiments including writing and/or storing the set of values in a memory device in a retrievable manner, the method proceeds to block 354.

At block 354, the method operates the furnace 10 according to the ACTUAL OPERATING CURVE generated at block 352. The operation at block 354 is substantially similar to the operation at block 346. From block 354, the method proceeds to block 356.

At block 356, the method determines whether the furnace 10 has requested a RELEARN. The operation of block 356 is substantially similar to the operation of block 320. If the method determines that a RELEARN has not been requested, the method proceeds back to block 354. However, if the method determines that a RELEARN has been requested, the method proceeds to block 322.

It will be appreciated that when the furnace 10 is operated according to the method 300, the furnace 10 may operate to satisfy a variety of DEMAND values from the low output capacity to the intermediate output capacity in accordance with an ESTIMATED OPERATING CURVE without first having to operate the furnace 10 at output capacities substantially greater than the intermediate output capacity. Similarly, when the furnace 10 is operated according to the method 300, the furnace 10 may operate to satisfy a variety of DEMAND values from about the intermediate output capacity to the high output capacity in accordance with an ESTIMATED OPERATING CURVE without first having to operate the furnace 10 at output capacities of about the intermediate output capacity or lower. Still further, it will be appreciated that the method 300 provides for operation of the furnace 10 according to an ACTUAL OPERATING CURVE after having first operated the furnace 10 according to an ESTIMATED OPERATING CURVE. In some embodiments, the ACTUAL OPERATING CURVE may more accurately provide operation speed values for the draft blower 26 than an ESTIMATED OPERATING CURVE according to which the furnace 10 was operated prior to determining the ACTUAL OPERATING CURVE.

In alternative embodiments, the output capacity percentages associated with each of LOW, INTERMEDIATE, and HIGH may be set at values other than 40%, 65%, and 100%. However in some embodiments, the output capacity associated with LOW, the pressure $P_L$, and the low pressure limit switch 64 (when configured to actuate at $P_L$) may be set as any other value below which may be undesirable to operate the modulating combustion system 14 because of a high risk of flame extinguishment. Similarly, the output capacity associated with HIGH, the pressure $P_H$, and high pressure limit switch 68 (when configured to actuate at $P_H$) may be set at any other output capacity above which value furnace 10 is not required to operate. Further, the output capacity associated with INTERMEDIATE, the pressure $P_I$, and intermediate pressure limit switch 66 (when configured to actuate at $P_I$) may be set at any other value between the output capacities associated with LOW and HIGH.

Figure 5:
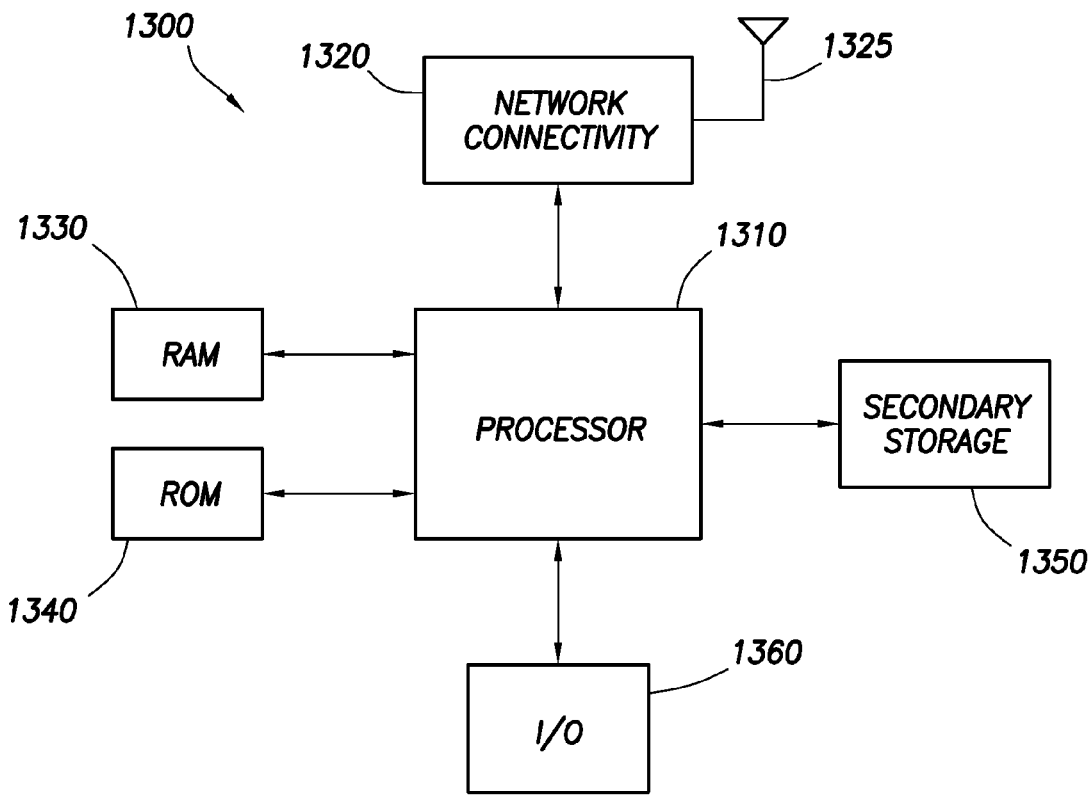
FIG. 5 illustrates a general-purpose processor (e.g., electronic controller or computer) system suitable for implementing the several embodiments of the present disclosure.

Referring now to FIG. 5, the furnace 10 or associated components may comprise a processing component (as a component of draft blower 26 and/or control assembly 20) that is capable of executing instructions related to the actions described previously. The processing component may be a component of a computer system. FIG. 5 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and output to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices (i.e., a thermostat). Also, the transceiver 1325 might be considered to be a component of the I/O devices 1360 instead of or in addition to being a component of the network connectivity devices 1320. Some or all of the I/O devices 1360 may be substantially similar to various components depicted in the previously described FIGS. 1 and 2.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A modulating gas furnace, comprising:
a variable speed draft blower;
a modulating gas valve;
a low pressure tap and a high pressure tap; and
at least one processor configured to:
monitor a differential pressure between the low pressure tap and the high pressure tap;
learn an intermediate differential pressure value associated with operating the modulating gas furnace at an intermediate output capacity that is between a minimum output capacity of the modulating gas furnace and a maximum output capacity of the modulating gas furnace;
learn at least one of a high differential pressure value associated with operating the modulating gas furnace at the maximum output capacity and a low differential pressure value associated with operating the modulating gas furnace at the minimum output capacity;
establish an estimated operating curve using either the intermediate differential pressure value and the low differential pressure value or using the intermediate differential pressure value and the high differential pressure value; and
control the variable speed draft blower and the modulating gas valve in accordance with the estimated operating curve, wherein the estimated operating curve is established using the intermediate differential pressure value and the low differential pressure value in response to a demand for heat being equal to or greater than the minimum output capacity and being less than or equal to the intermediate output capacity, and wherein the estimated operating curve is established using the intermediate differential pressure value and the high differential pressure value in response to the demand for heat being greater than the intermediate output capacity.

2. The modulating gas furnace of claim 1, wherein the at least one processor system is further configured to:
learn the high differential pressure value in response to the estimated operating curve being based on the intermediate differential pressure value and the low differential pressure value;
learn the low differential pressure value in response to the estimated operating curve being based on the intermediate differential pressure value and the high differential pressure value;
establish an actual operating curve based on the low differential pressure value and the high differential pressure value; and
operate the variable speed draft blower and the modulating gas valve in accordance with the actual operating curve.

3. The modulating gas furnace of claim 2, wherein at least one of the low differential pressure value and the high differential pressure value and at least one of the estimated operating curve and the actual operating curve are relearned in response to a relearn command.

4. The modulating gas furnace of claim 1, wherein the minimum capacity is set to a value below which a gas flame of the gas furnace is likely to extinguish.

5. The modulating gas furnace of claim 1, wherein the maximum capacity is set to a value above which the gas furnace is not capable of operating.

6. The modulating gas furnace of claim 1, wherein the maximum capacity is set to 100% of the output capability of the gas furnace, the minimum capacity is set to 40% of the maximum capacity, and the intermediate capacity is set to 65% of the maximum capacity.

* * * * *